July 18, 1944.  P. V. PALMQUIST  2,354,049

BACKLESS REFLEX LIGHT REFLECTOR

Filed Jan. 19, 1944

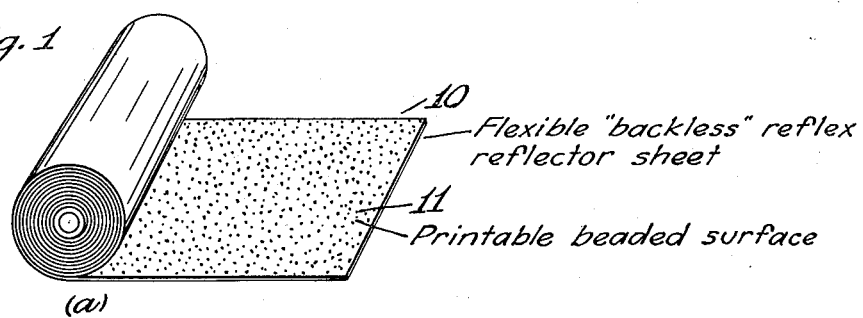

Fig. 1
10 — Flexible "backless" reflex reflector sheet
11 — Printable beaded surface

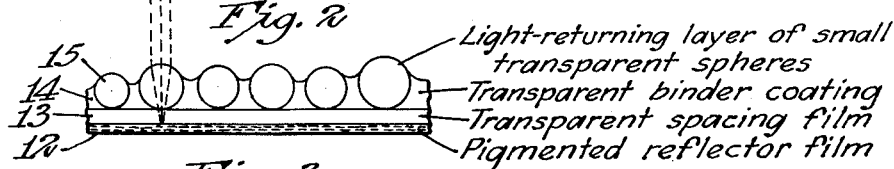

Fig. 2
15 — Light-returning layer of small transparent spheres
14 — Transparent binder coating
13 — Transparent spacing film
12 — Pigmented reflector film

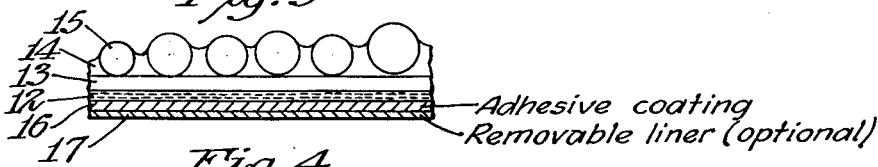

Fig. 3
16 — Adhesive coating
17 — Removable liner (optional)

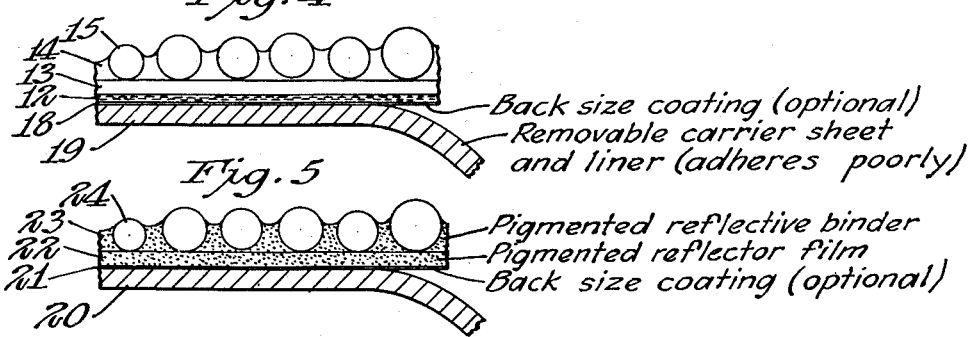

Fig. 4
18 — Back size coating (optional)
19 — Removable carrier sheet and liner (adheres poorly)

Fig. 5
24 —
23 — Pigmented reflective binder
22 — Pigmented reflector film
21 — Back size coating (optional)
20 —

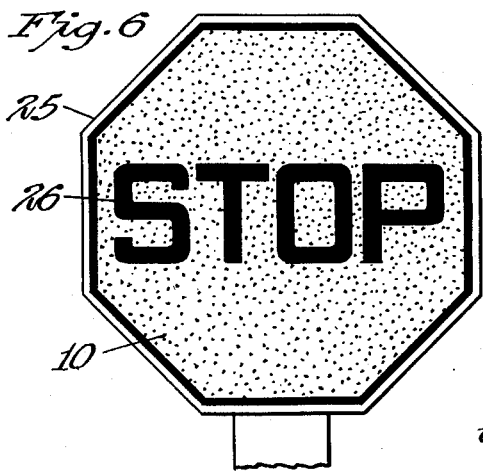

Fig. 6

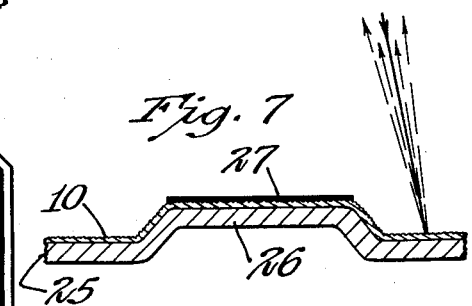

Fig. 7

Inventor
Philip V. Palmquist
Carpenter Abbott Coulter & Kinney
Attorneys

Patented July 18, 1944

2,354,049

UNITED STATES PATENT OFFICE 2,354,049

BACKLESS REFLEX LIGHT REFLECTOR

Philip V. Palmquist, New Canada Township, Ramsey County, Minn., assignor to Minnesota Mining & Manufacturing Company, St. Paul, Minn., a corporation of Delaware Application January 19, 1944, Serial No. 518,846

24 Claims. (Cl. 40—135)

This invention relates to a "backless" type of reflex light reflector sheet material of the class in which a light-returning layer of contiguous small transparent beads or spheres is partially embedded in a bonding layer, with pigment light-reflecting means being located behind the beads, so that an incident beam or ray of light is refracted and reflected in such manner that a brilliant cone of light is selectively returned toward the source, even though the incident light strikes at an angle (see Fig. 7). The characteristic of such a reflector in returning back a brilliant cone of light toward the source of an angularly incident ray, gives rise to the term "reflex" reflector, to distinguish from mirrors which cause specular reflection, and from diffusing surfaces which dissipate the incident light in all directions without selective return in the direction of incidence. Where light is reflexively reflected, an observer located near the axis of an incident beam or ray of light will be able to see the reflected light at far greater distances than would be the case if diffuse reflection occurs. The invention also relates to signs and markers in which such flexible reflex reflector sheet material is employed. Road signs and markers of the reflex type have greater visibility at night than do ordinary signs, to the occupants of approaching vehicles, because less of the reflected light is dissipated outside of the field of viewing, the reflected light being concentrated in a narrow cone which is substantially co-axial with the incident beam of light.

This application is a continuation-in-part of my copending application Ser. No. 351,168, filed August 3, 1940.

A detailed discussion of the optical principles of reflex reflector sheets, and the influence of various optical structures on reflex reflection characteristics, is not thought to be needed in this specification, in view of the discussions already given in my Patent No. 2,294,930 (issued September 8, 1942), and in the M. L. Gebhard, H. Heltzer, J. E. Clarke and E. P. Davis Patent No. 2,326,634 (issued August 10, 1943). The present invention relates to a general type and method of construction which has a broad field of application and is not limited to reflector sheets of a particular optical structure only.

More particularly, the present invention relates to self-sustaining flexible beaded reflex reflector sheet material of what I term the "backless" type; in contradistinction to beaded sheet material built up on a base or backing underlying the reflector means and relied on as a support for the reflex reflecting structure and constituting an integral or permanent element of the manufactured sheet product, remaining a part of the sheet in its ultimate location and use. The present construction is thus quite different from reflex reflector sheets in which an integral base or backing (whether flexible as in the case of cloth or paper, or relatively rigid as in the case of sheet metal or wood) is employed as a permanent support on which various coatings are applied to provide reflecting means and binder means for the layer of small spheres. The term "backless" does not, however, exclude the provision of a temporary support or liner to which the inherently self-sustaining reflector sheet removably adheres, and from which it can be readily stripped, as when it is to be applied to a desired sign base in making up a sign.

The invention provides a flexible "backless" beaded reflex reflector sheet wherein a front light-returning layer of small transparent beads or spheres is bonded in a self-sustaining flexible non-fibrous film sheet structure, which includes pigment light reflective means underlying the spheres; constituting a thin and pliable, unitary, reflex reflector sheet adapted to be readily cut to any desired shape or form (as by means of a knife or shears) and to be readily attached to a desired base in forming a sign or marker. The small size of the beads or spheres provides a beaded front surface which is relatively smooth and it may be readily printed, painted, stenciled or screen processed to provide a desired design, insignia or marking. A reflex reflecting area of such a sheet produces a reflection which appears continuous over the area to an observer located only a short distance away, the eye being unable to resolve reflected rays from adjacent individual spheres and from between the spheres, owing to the small size of the spheres, there being at least several hundred spheres per square inch. To the contrary, reflex reflector buttons, which have long been used in making signs, being relatively large, are seen individually even when mounted close together and an array of contiguous buttons does not provide a reflective sign surface comparable to that provided by the present reflector sheet.

The reflector sheet material may, if desired, be manufactured in continuous web fashion in any reasonable width and length, and may be supplied to purchasers and users in roll form.

A further object is to provide waterproof and weatherproof reflector sheet material of the character described, which is highly suited for use in making outdoor signs and markers, remaining effective for at least a year of continuous outdoor exposure to sunlight, rain, snow, and extremes of temperatures.

The reflector sheet material may be made with sufficient stretchiness so that it can be readily conformed to irregular surfaces, as for example to the surface of an embossed metal sign base.

The reflector sheet may be fastened to desired base surfaces in various ways. Thus it may be tacked, stapled or rivetted, or may be bonded by an adhesive or cement. It may be provided with an initial integral adhesive coating on the back so as to be in ready-to-lay form.

The absence of a permanent backing makes for superiority of the present "backless" flexible reflex reflector sheet in regard to all of the above-mentioned objects and features. Thus the presence of one or more fibrous fabric lamina in a sheet having a paper or cloth backing not only makes for undesirable or unnecessary thickening and stiffening, but makes for a sheet which is not as highly unified and is more prone to split or delaminate after subjection to weathering influences. When such a sheet is cut, as in making up signs or markers, fiber ends are exposed at the edges which permit access to the interior of the sheet of moisture absorbed from the air or from rain or snow, even though the fabric was subjected to a waterproofing impregnation treatment before or during the manufacture of the reflector sheeting. While this latter result can be minimized, in making signs or markers, by applying a waterproof sealer to the edges of the cut sheet, such procedure means added trouble and expense. The present film structure avoids this difficulty.

As previously indicated, the present invention can be utilized in making reflex reflector sheets having various optical structures and properties employed in obtaining various desired optical characteristics. Thus, for example, it can be utilized in making sheets of the type wherein the transparent spheres are embedded in a reflective pigmented binder so that reflection occurs at the exposed concave surfaces of the binder which are around the inner surfaces of the spheres; and in making sheets of the type wherein the spheres overlie and are spaced from a pigmented reflector film, being held in position by a binder, so that reflection occurs from an underlying surface spaced away from the inner extremities of the spheres.

Various other objects and features will be apparent from the following description of illustrative embodiments of the invention.

In the accompanying illustrative drawing:

Fig. 1 shows a roll of flexible reflex light reflector sheeting having a printable beaded surface layer of small transparent spheres (glass beads);

Figs. 2, 3, 4, and 5, are sectional diagrams indicating in magnified form the structures of illustrative embodiments of reflex light reflector sheets; and Fig. 6 is a plan view of a highway "stop sign" having embossed (raised) lettering, over the whole surface of which a stretchy reflex light-reflector sheet has been applied to provide improved night visibility, the beaded surface of the sheet being covered over with black ink or paint in the raised letter areas to provide black lettering as in an ordinary sign, and the remaining areas providing a contrasting reflective background both by day and night to make the lettering stand out more plainly.

Fig. 7 is a diagrammatic sectional view taken through one of the raised letters in Fig. 6, and the right hand portion illustrates the concentrated cone of reflex reflected light returning toward the source of an angularly incident ray or beam which produces it.

Referring to the drawing, Fig. 1 shows a roll of flexible reflex light reflector sheeting 10 having a top exposed light-returning layer of small transparent spheres or beads 11 which, in combination with underlying reflector means, produces reflexive reflection of an incident beam or ray of light, due to the refracting and collimating action of the spheres, which provide a multiplicity of contiguous convex lens elements. As there are at least several hundred spheres per square inch, with the number substantially exceeding 10,000 when spheres of less than 10 miles average diameter are employed, the beaded surface is relatively continuous and smooth in appearance and to the touch, and may be readily printed, painted or screen processed. The small spheres and the "backless" construction permit of a relatively thin sheet, which is preferably not over about 20 mils in total caliper thickness, making not only for economy of material but for flexibility and pliancy. These factors also aid in making possible a stretchy sheet which can be readily and smoothly conformed to irregular base surfaces, such as the surface of embossed metal sign bases.

Referring to Fig. 2, there is shown a diagram illustrating in highly magnified fashion the cross-sectional structure of a particular type or species of the product. The diagram is not a literal section view, since the spheres are spaced farther apart than is customary in sign sheets; and each circle represents a full circumference, which would not be the case in a true section as the spheres are not actually arranged in rows but are packed so that a section plane could not be passed through the centers of a series of adjacent spheres. This reflex reflector sheet has a pigmented back light reflector film 12 (comprised of a binder and reflective pigment) which is flexible and, instead of being mounted on a backing, serves itself as the back element of the reflector sheet structure proper. This reflector film may be a lacquer or resin coating containing a reflective pigment. A pigment such as titanium dioxide results in a reflector of the non-specular type. A metallic flake pigment (such as aluminum flakes), with the flakes lying substantially flat or parallel to the surface, results in a reflector of the metallic semi-specular type. The type of reflection provided by the reflector film is an important factor in determining the optical properties of the reflex reflector sheet, as will be explained more fully hereinafter.

Overlying and bonded to said pigmented reflector film is the flexible transparent spacing film 13, which may either be a precast film upon which the reflector film is coated or laminated, or may be a film which is cast or formed in situ in the manufacture of the sheet. A transparent binder coating 14 overlies and is bonded to the spacing film. A layer of small transparent spheres 15 is partially embedded in the binder coating so that the outer portions of the spheres are exposed to provide a multiplicity of contiguous convex lens elements, while the inner extremities touch or closely approach the outer surface of the underlying spacing film. The binder coating has a thickness sufficient to hold the spheres firmly in place, extending above the middles of the spheres to provide good holding sockets.

The transparent spheres may be made of any suitably hard transparent solid material, such as quartz, ordinary inorganic glass, or a suitable so-called organic glass (such as a hard polymer of methyl methacrylate), all of which are to be understood as embraced by the term "glass" as herein used, regardless of chemical composition, except when a specific type is expressly designated. Small spheres are employed to provide several hundred, at least, per square inch. Small spheres having a diameter not exceeding about 40 mils are used to provide a surface of a character which can be printed upon and make possible a relatively thin and flexible sheet, but should preferably have an average diameter not exceeding about 10 mils. Excellent results in making thin and stretchy sheets are obtained by using spheres having an average diameter in the range of 3 to 6 mils, in which case the sheet will have upwards of 10,000 per square inch. The use of spheres in the range of 3 to 6 mils diameter permits of making reflector sheets having a caliper not exceeding about 20 mils, as measured by a micrometer, this caliper thickness being the maximum thickness and not the average thickness. In a batch of small spheres, even after ordinary screen grading to secure uniformity of size, there will be some variation in size as between individual spheres, which preferably should be held within limits so that most of the spheres will not vary from the average diameter by more than 50%, especially in making a Fig. 2 type of sheet in which the spheres are spaced from the reflector surface.

In the case of stretchy reflex reflector sheets, a stretch of at least about 20% is desirable in order to secure good conformation over the irregular surfaces of embossed sign bases, and this should be a "dead-stretch" (as distinguished from the live-stretch of a rubber band) to prevent undue retractive forces in the stretched sheet which would tend to pull the sheet away from the irregular surface. This stretchiness is also advantageous in applying the sheet to "flat" base surfaces to secure good conformity and avoid waviness, as perfect flatness is not obtainable as a practical matter and hence the interface will not be a perfect plane. Stretchy reflex reflector sheets of the present film type are well adapted for bonding to road surfaces for providing indicia, such as guide lines ("road stripping"), markers and lettering or symbols.

An incident beam of paraxial light rays (illustrated by (a) in Fig. 2) will be refracted in passing into a sphere and will converge, coming to approximate focus behind the sphere when it is of glass having an ordinary index of refraction. Assuming that substantially no refraction occurs at the rear surface of the sphere, as is true when the refractive indices of the spheres, binder coating, and spacing film are substantially the same, the convergent rays will pass through and beyond the sphere without substantial further bending and will strike the underlying reflector 12. The reflector will then emit a divergent cone of light rays which will pass out through the sphere, and upon emerging will be refracted so as to redue the angle which the rays make with the optic axis, and will return toward the original source of light as a concentrated cone. The degree of divergency of the rays returning toward the source from the outer sphere surface is dependent on the nature of the reflector, the refractive index of the sphere, and the thickness of the spacing film. Optimum brilliancy of reflex reflection, as viewed by an observer located near the axis of the incident light beam, is secured by an optical structure which reduces to a minimum the degree of divergency of the returning rays, so as to minimize wasting light outside the viewing zone. This is accomplished by having the incident rays strike the reflector when most nearly in focus. A perfect focus is impossible due to the optical spherical aberration effect, even if the sphere were perfectly round, but a spacing distance can be chosen to secure the optimum of possible brilliancy. In the case of a sphere of ordinary glass, having a refractive index of about 1.50–1.55, the optimum distance for spacing the inner extremity from the reflector, is about one-third the diameter of the sphere. The optimum spacing distance decreases with increase of refractive index of the sphere until it becomes zero (no spacing) at an index of approximately 1.85–1.90. Over-spacing not only causes a loss of brilliancy but a poorer angularity characterictic. Under-spacing causes a loss of brilliancy as regards an observer close to the axis of incident light which strikes the reflector at a small angle to the normal, but produces greater angularity and divergency.

When a layer of spheres is spaced from the reflector surface by a transparent spacing layer of uniform thickness, so that the inner extremities of the spheres are an equal absolute distance from the reflector, and the spheres differ from each other in diameter, the spacing ratio will differ as between spheres of differing diameter. The average spacing ratio in such case may be computed by dividing the spacing layer thickness by the average diameter of the spheres. Some individual spheres will then be spaced a greater distance than others, having reference to the ratio value; those of larger than average diameter being under-spaced and those of smaller diameter being over-spaced. Hence an average spacing ratio is preferable which is slightly less than the value which would be used if all the spheres had the same diameter, so as to insure that fewer individual spheres are over-spaced (under-spacing being preferable to over-spacing). However, useful results can be obtained even though there is a departure from the optimum or most desirable value. In the case of ordinary glass spheres (refractive index about 1.50–1.55), a spacing distance within the range of about 20–40% of the average diameter gives best results for most purposes. In commercial manufacturing practice, the optical consequences of variations in spacing can be readily observed so as to provide a guide to making adjustments to secure the desired result.

When the transparent spacing and holding medium located between the spheres and the spaced reflector has a refractive index substantially different than that of the spheres, the optimum spacing distance will be different on that account, owing to the substantial refraction or light-bending which will take place at the inner surfaces of the spheres. The optimum spacing distance will be decreased or increased if the medium has a refractive index less or greater, respectively, than that of the spheres.

In connection with the influence of spacing on optical properties, it should be clearly understood that it is not the absolute distance which is determinative, but the ratio of the spacing distance to the sphere diameter. The same ratio produces the same effect whatever the sphere diameter, and hence the need of spacing to secure optimum brilliancy is not overcome by using small spheres, although the absolute distance is reduced proportionally with a reduction in sphere diameter, but having the same critical effect.

This light-returning phenomenon occurs even when the beam of rays is incident at an angle, whence the designation "reflex." The reason is that some of the rays emitted from the reflector 12 will be within the field of the angular convergent cone which strikes it and will return toward the source along the same path, or close to it, that was followed by the incident rays.

When a highly diffusing type (non-specular) reflector is used, there will be sufficient rays emitted in the right direction to return along the path of the angularly incident rays, so as to avoid substantial drop in brilliancy for rays incident even up to relatively large angles, as viewed by an observer near the axis of the beam of incident light. A reflex reflector of this kind is said to have good "angularity." A highly specular reflector underlying the beads would emit few rays in the right direction to be returned to the source, when the incident light approaches at a substantial angle, and hence would cause poor angularity. An intermediate type of reflector, which may be called semi-specular, such as is obtained by using metallic reflecting pigment flakes which lie approximately parallel to the plane of the reflector, gives a useful combination of high brilliancy coupled with a good enough angularity such that the actual observed brilliancy is substantially greater than for non-specular reflectors up to fairly large angles (about 30°). These factors, including the regulation of the spacing distance, allow of considerable scope in design so as to obtain a reflex reflector best suited to a particular requirement. For reflex reflector sheets to be used in making vertical highway signs located beside the highway and at approximately right angles to it, maximum distance visibility at night by reflex reflection is obtained by using a spacing distance which gives maximum brilliancy for small angles of incidence as viewed by an observer located close to the axis of incident light, and this spacing distance is in the range of approximately 20–40% of the average sphere diameter when spheres are used having a refractive index of approximately 1.50–1.55.

The Fig. 2 structure, as shown and above described, involves a binder coating distinct from the spacing film. The same type of optical structure can be secured by omitting the separate spacing film and employing a single transparent binder coating of sufficient total thickness to take its place. Control of spacing of the spheres away from the reflector film is then somewhat more difficult, but can be accomplished by using a binder coating composition of such viscosity and surface tension that the small spheres, when sprinkled thereover, will sink in to the desired extent and no more, followed by setting-up the binder to its final state. When no spacing is used, the spheres are pressed down so as to rest in contact with the reflector film, the amount of binder used being such as to leave the outer extremities exposed.

Fig. 3 shows a "backless" reflex reflector sheet having the same structure as the one illustrated in Fig. 2 (the same reference numerals 12, 13, 14 and 15 being used to designate the same elements previously described); but having an adhesive coating 16 on the back, bonded to the rear face of the reflector film 12, and which is covered over by a removable liner sheet 17, the latter being optional. The adhesive coating should be waterproof for reflex reflector sheets intended for outdoor use. It may be of a solvent-activatable type, or of a heat-activatable type, or one which may be activated to adhesiveness either by use of a solvent or use of heat. Such adhesives are normally non-tacky, or substantially so, and require activation at the time of use to produce the desired adhesion or bonding to the base surface to which the sheet is applied, as in making up a sign. A pressure-sensitive adhesive coating may be used, by which is meant an adhesive which is normally tacky and adheres to a surface against which it is pressed without need of activation, such kind of adhesive being illustrated by those employed in pressure-sensitive adhesive tapes. The removable liner (when used) protects the exposed back surface of the adhesive coating, and also allows the reflector sheet to be wound in roll form without any danger of adhesive material offsetting on the exposed bead surfaces upon unwinding. The use of liners for the adhesive coating on adhesive sheets and tapes is well known and hence a detailed discussion is unnecessary. Holland cloth is a well known example of liner sheeting. Another example is a film of regenerated cellulose ("Cellophane"), which can readily be removed by moistening and peeling away from the waterproof adhesive surface. The removable liner is auxiliary to the reflector sheet proper, serving a temporary purpose, and its presence does not mean that the reflector sheet itself is not of the "backless" type, as previously mentioned, as it is removed when the reflector sheet is applied to a base surface in making a sign or marker. The presence of the adhesive coating, which is a permanent element of the structure, does not cause the reflector sheet to cease to be of the "backless" type, as it is applied to a reflex reflector sheet which is inherently self-sustaining and is complete in itself as regards its fundamental character, the adhesive coating merely making the reflector sheet ready-to-lay and taking the place of a cement or adhesive which might otherwise be employed at the time of use to bond the reflector sheet to a base surface in making a sign or marker.

Instead of using a separate adhesive coating as shown in Fig. 3, the reflector film 12 may itself serve this function in a structure such as illustrated in Fig. 2. This film, whether precast or formed in situ by drying an applied coating, may include a binder for the reflective pigment, or an adhesive component, which can be activated by a solvent therefore, or by heat, to a tacky surface state permitting of direct bonding to a surface to which the sheet is applied. Or the reflector film may be a pressure-sensitive adhesive coating pigmented with a reflective pigment, such as is employed in the pressure-sensitive tape field in making colored adhesive tape (c. f. R. G. Drew patents, Nos. 2,177,627 and 2,331,894, and H. J. Tierney Patent No. 2,319,959). In such cases, the reflector film may be protected by a removable liner as explained in connection with Fig. 3.

Fig. 4 shows a reflex reflector sheet having the same structure as the one illustrated in Fig. 2 (the same reference numerals 12, 13, 14 and 15 being used to designate the same elements previously described); but having a back size coating 18 covering and integrally bonded to the back face of the reflector film 12. This back size coating protects the back surface of the reflector and is relatively very thin compared to the thickness of the reflex reflector sheet. Although it is an integral and permanent element and underlies the reflector, it is not a backing in any ordinary sense and is not used to perform the function of a backing, being a mere sizing on a sheet which is itself fully self-sustaining in the absence of such a coating. In addition to its protective function, it may also be employed to advantage in the manufacture of reflex reflector sheets which are formed by casting the layers on a removable carrier sheet base.

The reflector sheet can be built up by employing a carrier sheet 19 having a smooth surface, such as a non-fibrous film (illustrated by a cellulose acetate film) or a paper sheet which has been coated with a film-forming composition which results in a flat and smooth surface. On the smooth surface of such carrier sheet there is applied a coating composition which on drying or setting-up results in the thin back size coating 18, and this composition is selected so that the back size coating adheres poorly to the surface of the carrier sheet, so as to permit of ultimate stripping apart, but is capable of firmly bonding to the next applied coating. There is next applied a pigmented coating composition which anchors to the back size coating and on setting-up provides the reflector film 12. This in turn is coated with a transparent composition to provide the spacing film 13, over which is formed the transparent binder coating 14 in which the layer of small spheres 15 is partially embedded. Following completion of the reflector sheet, the carrier sheet 19 may be stripped off as a step in the manufacturing operation and, if desired, an adhesive coating or layer may be bonded to the exposed surface of the back size to provide a reflector sheet of the ready-to-lay type; and if desired a temporary liner may be applied to the adhesive coating for reasons previously mentioned. However, the carrier sheet 19 may be retained in place to serve as a liner and temporary support for the reflex reflector sheet proper, being removed by the user at the time of making up a sign (as indicated in Fig. 4). This carrier sheet when thus retained will not interfere with the ready cutting of the whole sheet, as during slitting operations in making up rolls or cutting of the sheet to desired sizes or shapes. The back size coating may be omitted and the reflector film cast directly on the surface of the carrier sheet when the reflector coating composition is so chosen, with respect to the surface character of the carrier sheet, as to cause low adhesion of the reflector film which will allow of ultimate stripping off. Illustrations of production methods are set forth in more detail hereinafter in Examples 4 to 7.

In the structures shown in Figs. 2, 3 and 4, the reflector film 12, which underlies the spheres, may constitute a reflector which is uniform over the whole area of the manufactured sheet, as where it is cast or coated from a single reflective coating composition. However, the reflector film may be made so as to differ in light reflective properties in different areas, so as to provide contrasts delineating desired insignia (such as designs, symbols or lettering), in which case Figs. 2, 3 and 4 may be regarded as showing a portion of the reflector film in a particular area of a sheet. The insignia may be formed by printing, screen processing or painting, using different reflective coatings in different areas. Certain areas may be made opaque and non-reflective, as by using a black paint or ink if desired, so as to provide black lettering, or a black background for white or colored lettering, for example.

The reflector film need not constitute a single coating or lamina. For example, the reflector film may constitute an aluminum flake reflective coating covering the whole area, but with overlying printing in certain areas to provide black or colored areas or insignia underlying the spheres in the final sheet and visible through the transparent elements so as to provide a sign or marker. A transparent colored ink can be used for printing desired areas, so as to color the light reflected from the underlying metallic reflective coating and thus provide desired insignia.

Also, certain portions of the whole area of a sheet may be left transparent, so that when the reflector sheet is applied to a base surface the latter will be visible through the transparent apertures. Thus if a reflector film is provided by printing or stenciling the sheet so as to provide a reflective surrounding area defining one or more letter or symbol areas which have been left transparent, and the sheet is applied to a black sign base, the resultant sign will show the black letters or symbols, surrounded by the reflecting background provided by the reflector sheet. To accomplish this result with the Fig. 3 type of construction, the adhesive coating 16 should be transparent; and in the Fig. 4 type of construction, the back size coating 18 should be transparent. A further alternative is to employ a black, or a reflective, adhesive (Fig. 3) or back size (Fig. 4) which is visible through the transparent openings provided in the reflector area (when reflector 12 is omitted from certain areas).

Colored transparent spheres may be employed in conjunction with an underlying white or silvery (aluminum flake) reflector film to produce colored reflection. Colored spheres may be used in particular areas to form colored lettering, designs or background. Colored reflection, when a white or silvery reflector film is used, may also be secured by employing transparent spacing films which are dyed the desired color.

Fig. 5 illustrates a further species of reflex reflector sheet which differs in optical properties from those previously described as a result of the small transparent spheres being embedded in a reflective binder so that the lower surface of each sphere is in contact with a concave spherical reflector, reflection of both normal and angular incident light rays thus occurring at the concave under surfaces of the spheres rather than from a flat reflector underlying the spheres, and there is no spacing of the spheres from the reflector. Such an optical arrangement makes for excellent angularity, there being no drop in brilliancy up to angles of incidence of at least 45°. The lack of spacing results in a very considerable sacrifice of brilliancy when spheres of ordinary glass are used; which may, however, be overcome by using spheres of higher refractive index; the optimum of brilliancy being obtained with a refractive index of about 1.85–1.90, there being no sacrifice of good angularity and divergency properties, owing to the concave form of the reflector. For a full discussion on these points see the previously mentioned Gebhard, et al., Patent No. 2,326,634.

This type of reflex reflector sheet is well adapted for bonding to road surfaces for providing indicia, such as guide lines ("road striping"), markers and lettering or symbols, particularly when a stretchy film construction is used to facilitate conformation.

The particular embodiment shown in Fig. 5 is built up by coating a smooth-surfaced carrier sheet 20 with a back size coating 21 which on setting-up poorly adheres thereto so as to permit of ultimate stripping apart. A reflector film 22 is bonded to the surface of the back size coating. Thus far the procedure is the same as described in connection with Fig. 4. The reflector film is coated with a reflective binder 23 in which is partially embedded a layer of small spheres 24, the spheres substantially touching the surface of the reflector film, which permits control of the depth of penetration of the spheres in the binder layer and insures that the rear extremities of the spheres will contact a reflective surface. However, a single reflective binder coating may be used in place of the two element combination of reflector film and binder, in which case the penetration of the spheres should be controlled so that the reflective binder is not fully penetrated, in order to provide a reflective covering for the inner extremities. The reflective pigment employed in the binder may be either of the non-specular type (such as titanium dioxide pigment) or of the semi-specular metallic type (such as flaked aluminum).

Figs. 6 and 7 show a highway "stop sign" illustrating a use of the reflex reflector sheet. The sign base is a regular embossed metal sheet 25, the lettering being raised above the background by embossing, as illustrated by the sectional view of a portion of a letter 26 shown in Fig. 7. Over the whole surface area of the base there is applied and bonded a stretchy "backless" reflex reflector sheet 10, which may have any one of the structures previously described in connection with Figs. 2, 3, 4 and 5, for example; the removable carrier sheet or liner being of course removed in advance of application if present. The reflector sheet should be of the stretchy "dead-stretch" type so that it can be readily pressed to make a snug fit to the irregular surface, a stretch of about 20% or more being most desirable. If a sheet is used which does not have an integral adhesive coating on the back, the sign base may first be coated with an adhesive or cement, the reflector sheet then being applied thereover while the adhesive coating is still tacky. Conformation of the sheet to the surface can readily be made by pressing down the laminated sheet by means of a soft roller. If any air pockets are formed under the reflector sheet, or any buckles result, they can be removed by locally pricking through or slitting the sheet and then pressing down to provide smooth contact and conformation to the base surface. The applied sheet can be originally cut to provide margins extending beyond the base area, which can be folded back around the sign edges, or can be trimmed off to provide accurate coverage. A preferred type of adhesive or cement is one of the polymerizing kind which set-ups by polymerizing. If applied in a solvent vehicle (used to facilitate coating), the sheet is applied after the solvent has evaporated from the adhesive coating in order to prevent the solvent from being trapped. When a ready-to-lay type of sheet is used, having an integral back coating of adhesive, it can be applied directly, the adhesive being activated in any suitable way, before or after application of the sheet to the base, depending on the nature of the adhesive. A pressure-sensitive adhesive does not need activation, being normally tacky.

The resultant raised areas of the reflex reflector sheet, which overlie the lettering, can then be blacked out, as by running a roller, coated with black ink or enamel, over the sign so as to cause transfer of the ink or paint to the raised areas. The lettering will then appear black, as in the ordinary highway sign. This is shown in Figs. 6 and 7, the black coating 27 on a particular letter being indicated in Fig. 7. The remaining area of the sheet provides a contrasting reflective background, the reflex reflection produced by the background area being indicated by the rays of light indicated in the right hand part of Fig. 7.

The background area of "stop signs" is generally yellow. This effect can be obtained by employing yellow lead chromate pigment, for example, in making the reflective element of the reflector sheet. The background area will appear yellow both by day (when viewed by diffuse daylight) and by night (when viewed by reflex reflection by occupants of approaching vehicles, the head lights providing the incident light and the occupants being near the axis so as to be within the brilliant cone of returning light). Such a sign will be visible and readable at night at far greater distances than is true of an ordinary black-yellow "stop sign," due to the reflex reflection characteristic.

A further advantage of the "backless" film type construction of the reflex reflector sheet, is that it resists vandalism. If a vandal attempts to pry or strip off the reflector sheet from the base to which it is bonded, the film sheet will tear or break locally so that only a very small piece can be removed at a time, making the enterprise so difficult and profitless as to discourage the effort. In the case of road striping, this feature insures against the reflector strip being ripped off by spinning or skidding vehicle tires.

The present invention provides a way by which existing embossed traffic signs can be readily and inexpensively converted to signs of the reflex type, since the stretchy reflex reflector sheeting can be applied to the metal sign base without the need of highly skilled labor or elaborate equipment, as is apparent from the foregoing description.

Various illustrative forms and materials of construction are illustrated by the following examples:

EXAMPLE 1

This example illustrates a method of making reflex reflector sheeting having the structure shown in Fig. 4 (except that no back size coating is employed), and illustrates the use of a coated paper as the removable carrier sheet on which the reflector sheet is built up by a casting technique, and which can be removed and reused in making further reflector sheeting, or can be left in place as a removable liner which can be stripped off dry whenever desired (as distinguished from liners which must be moistened to be readily removed).

The carrier web is first prepared from a highly calendered hard-surfaced paper (as, for example, a 40 lb. per ream Acme Fourdrinier paper, or a 70 lb. Duracel Fourdrinier paper), by knife-coating one side with the following solution in an amount sufficient to provide a dried coating having a weight of about 10 grains per 24 sq. in. Formula proportions are in parts by weight:

| | Parts |
|---|---|
| Vinyl acetate polymer (such as AYAT type sold by Carbide & Carbon Chemicals Corp.) | 35 |
| Ground mica | 17.5 |
| Denatured ethyl alcohol | 65 |

The coating may be dried by heating at 120–130° F. for half an hour, to evaporate the alcohol solvent. The coating adheres tenaciously to the paper and provides a smooth surface adapted to receive the reflector film coating. This surface coating for the carrier web is chosen with reference to the composition of the reflector film coating so that when the latter is applied in solution form it will have a good wetting action and initial adhesion to the carrier web surface, but will adhere poorly on completion of drying or curing so as to permit of stripping apart when subsequently desired.

The following reflector film coating composition may be used to secure the desired result, being applied over the coated face of the carrier web by knife-coating in amount which will produce an ultimate dried film weighing about 10 grains per 24 sq. in.:

| | |
|---|---|
| Polyvinyl butyral (such as Vinylite XYSG sold by Carbide & Carbon Chemicals Corp.) | 16 |
| Flaked aluminum pigment (such as aluminum lining powder) | 12 |
| Tricresyl phosphate | 8 |
| Denatured ethyl alcohol | 72 |

The reflector film coating may be dried at 120–130° F. for half an hour to evaporate the alcohol solvent. The aluminum flakes will lie approximately flat (parallel to the plane of the sheet) to provide a reflector surface of the metallic semi-specular type. The polyvinyl butyral, plasticized or elasticized by the tricresyl phosphate, provides a waterproof, flexible and stretchy film. Other polyvinyl aldehyde polymer resins can be used in place of the polyvinyl butyral to provide suitable stretchy films.

The transparent spacing film is next formed by knife-coating the reflector film surface with the following composition in amount to produce a dried film of the desired thickness relative to the average diameter of the spheres to be used. Assuming the use of No. 11 beads having a diameter range of approximately 5 to 6 mils, and that a spacing distance of approximately 2 mils is desired, a dried spacing film weight of approximately 20–21 grains per 24 sq. in. is suitable, when formed from the following coating composition:

| | |
|---|---|
| Polyvinyl butyral (such as Vinylite XYSG) | 18 |
| Tricresyl phosphate | 9 |
| Denatured ethyl alcohol | 83 |

The resultant spacing coating may be dried for half an hour at 120–130° F. and provides the transparent spacing film 13 of Fig. 4. This film is integrally bonded to the underlying reflector film and is likewise waterproof, flexible and stretchy. It is sunfast and is not darkened nor deteriorated by the sun's rays on outdoor exposure.

The transparent bead binder coating is next applied by knife-coating the following coating composition over the spacing film, a wet weight of 10–13 grains per 24 sq. in. being suitable for holding No. 11 beads or spheres of approximately 5 to 6 mils diameter:

| | |
|---|---|
| Heavy blown castor oil | 100 |
| "Beetle No. 227–8" (50% solids) | 200 |

The "Beetle No. 227–8" is a 50% solution of thermo-setting urea-formaldehyde resin in a volatile solvent composed of 60 parts butyl alcohol and 40 parts xylol, sold by American Cyanamid Co. The blown castor oil serves as a plasticizer.

This composition makes for a binder coating layer which is flexible and stretchy, weatherproof and non-darkening, provides a good bond to inorganic glass beads and integrally bonds to the underlying polyvinyl butyral spacing film.

With the binder coating still in a wet or undried state, No. 11 inorganic glass beads or spheres having a refractive index of about 1.53 and a diameter range of about 5 to 6 mils, are applied in excess to form the lenticular light-returning layer, the beads sinking down in the wet coating until they touch, or closely approach, the surface of the spacing film. Positioning of the beads can be facilitated by passing the web over a batter. The web may then be passed down around a roller to cause excess beads to fall off.

The web, with its applied coatings, is then festooned on racks and oven cured to set-up the bead binder coating, using a curing time of 50–60 minutes at 212° F. Any surplus beads adhering to the surface can be removed by passing the web around a roller and subjecting the beaded surface to the action of a rotary brush and air blast, or by employing a knife blade spaced just far enough to catch and remove excess beads projecting above the proper layer of beads. The reflex reflector sheet can then be stripped from the coated paper carrier web and the latter can be reused.

The following data shows the mechanical properties in a quantitative way, being based on sheets made as described in this example, using No. 11 glass beads (5 to 6 mils diameter).

The "backless" sheet (after removal of the carrier web) had a total caliper thickness of approximately 13 mils, as measured by a machinists' micrometer. This represents the maximum thickness, between the back face and the outer extremities of the beads which project farthest, rather than the average thickness as might be calculated from the average bead diameter and thickness of the spacing and reflector films (such average thickness being somewhat under 10 mils). The sheet had a tensile strength of approximately 10 lbs. per inch width and a stretch of 110%.

The strength and stretch values were measured on a regular Model 37–4 electro-hydraulic tensile tester, made by the Thwing-Albert Instrument Company, of Philadelphia, Pa. The jaw opening was 4 inches, the initial length of the test strip subjected to tension thus being 4 inches, and the machine was set to produce jaw separation at the rate of 15 inches per minute. It will be understood that all of the similar data set forth in this specification is based on the test procedure here described.

EXAMPLE 2

This example illustrates alternative formulas for use in making a weatherproof and stretchy reflex reflector sheet by the procedure desired in Example 1, and hence the same description applies except as indicated.

The paper carrier web is surface coated with a 40% solution of isobutyl methacrylate polymer in xylol, using a coating weight (wet) of 13–16 grains per 24 sq. in., and is dried for 15 minutes at 120° F. to evaporate the xylol. This provides the smooth casting surface, adapted to permit ready stripping of the reflector sheet.

The reflector film coating composition is:

| | |
|---|---|
| "Beetle No. 227–8" (50% solids) | 50 |
| Heavy blown castor oil | 25 |
| Titanium dioxide pigment | 50 |
| Ethyl Cellosolve (ethyleneglycol-monoethylether) | 25 |

This may be applied in a wet coating weight of 20–23 grains per 24 sq. in. and is cured for one hour at 200° F. The resultant reflector film has a non-specular (highly diffusing) reflectance characteristic and is white. A yellow reflector can be made by using lead chromate pigment. Other pigments can be used to produce other colors.

The transparent spacing film is cast from the following composition, using a wet coating weight of 23-25 grains per 24 sq. in.

"Beetle No. 227-8" (50% solids) ............ 100
Heavy blown castor oil .................... 50

The coating is cured for one hour at 200° F.

The transparent bead binder coating has the same composition as the spacing film and is similarly cured after embedding of the glass bead-layer (the glass beads being of the No. 11 size when the above-mentioned coating weights are used).

The resultant "backless" reflex reflector sheet can then be readily dry stripped from the coated paper carrier web, and the latter reused.

In this construction the plasticized urea-formaldehyde reflector, spacing and binder layers, provide a pliant sheet which is highly waterproof and proof against delamination, and in which the glass beads are firmly held. The sheet is highly weatherproof and has a sufficiently stretchy nature for applying to embossed sign bases. The tensile strength is about 2.6 lbs. per inch width and the stretch is about 21%.

An alternative procedure is to omit the casting of the reflector film, the transparent spacing film being cast directly on the carrier sheet and the remaining procedure being the same. The resultant beaded sheet is stripped from the carrier web and is then coated, printed or painted on the back to provide a reflector sheet or sign structure.

Example 3

This example illustrates the production of reflex reflector sheeting having the structure shown in Fig. 4, including the back size coating 18; employing the general procedure described in Examples 1 and 2 except for the provision of the back size coating to provide a back surface which will adhere poorly to the particular carrier web employed so as to permit ready stripping without moistening.

The carrier web in this case is prepared by roll coating a Fourdrinier paper with 9-10 grains per 24 sq. in. of an aluminum lining varnish comprised of 100 parts of an oil-modified air-drying phenolic resin base varnish containing 10 parts of aluminum flakes (such as aluminum lining powder) followed by heating sufficient to thoroughly cure the coating. The aluminum flakes leaf out on the surface and provide a smooth and dense surface having a low ultimate adhesion to the back size coating, the varnish component being substantially absorbed by the paper, but serving to hold the flakes in position. The carrier web is thus provided with an essentially aluminum surface, but having sufficient roughness to prevent premature separation of the back size coating. An aluminum sheet or foil could be used, surface etched to provide the desired degree of roughness.

The back size coating composition, which is next applied, is a 15% solution in denatured ethyl alcohol of polyvinyl butyral resin (such as "Vinylite XYSG"), sufficient to provide a thin dried coating weighing 1 to 2 grains per 24 sq. in. The solvent is evaporated by drying for 15-20 minutes at 150° F.

The remaining steps and the formulas for the compositions are the same as in Example 2, for providing the reflector film, the transparent spacing film, and the transparent bead binder coating. The resulting "backless" reflex reflector sheet can then be stripped from the carrier web, the polyvinyl butyral back size coating remaining integrally bonded to the back face of the reflector film and permitting ready separation. The tensile strength and stretch of the reflector sheet are practically identical with the Example 2 sheet, showing that the back size coating has not appreciably influenced the strength and stretch of the sheet.

Adhesive back coatings

A wide variety of adhesives are suitable for coating on the back face of "backless" reflex reflector sheets, as herein described, to provide a sheet of the ready-to-lay type (such as is illustrated in Fig. 3, for example).

An example of a rubber-resin pressure-sensitive adhesive is one compounded of rubber and a tackifier, such as rosin or ester gum in lesser proportion than the rubber, and which may include a reinforcing pigment such as zinc oxide, being dissolved in heptane (volatile solvent) to provide a coatable viscosity. An adhesive of this type is described in R. G. Drew Patent No. 2,236,527, issued April 1, 1941.

A further example is a pressure-sensitive adhesive compounded of polyisobutylene ("Vistanex") and a lesser proportion of tackifier resin (such as hydrogenated indene resin), as described in H. J. Tierney Patent No. 2,319,959, issued May 25, 1943, which lists numerous suitable rubbery base and tackifier materials.

The adhesive solution may be coated on a Cellophane liner sheet, followed by drying to evaporate off the volatile solvent vehicle, and is then laminated to the back face of the reflector sheet, as by passing the two sheets between squeeze rolls with the tacky adhesive surface contacting the back face of the reflector sheet. The Cellophane liner may be left in place (as shown in Fig. 3), to be removed when desired by moistening and peeling off; or it may be removed following lamination and the reflector sheet may be wound directly in a roll without using a liner, subsequent unwinding being facilitated by the limited area of contact between the extremities of the beads and the contacting adhesive coating.

Pressure-sensitive adhesive coatings as described above, while tacky, are "eucohesive," by which it is meant that they are more cohesive than adhesive such that offsetting or transfer of adhesive material does not result when a sheet or tape coated therewith is unwound from rolls or removed from surfaces to which temporarily applied, and can be handled without transfer of adhesive material to the fingers. These adhesive coatings are waterproof, and are quite stretchy and hence suitable for use in making stretchy sheet material.

The following is an example of an adhesive coating solution which may be applied to provide (after evaporation of the solvent vehicle) a waterproof and stretchable adhesive coating which is both solvent-activatable and heat-activatable:

Parts

Rubber base:
45% reclaim rubber ⎫
45% zinc oxide       ⎬ combined on
10% latex crepe      ⎭ rubber mill ....... 102
Rosin .................................... 29
"Nevillite resin" of 150° C. melting point (hydrogenated indene-coumarone resin) .. 21
Oleum spirits (volatile petroleum hydrocarbon solvent of 306°-424° F. boiling range) . 80
Ethyl alcohol (denatured with gasoline) ... 1

The components are mixed in an internal mixer (such as a "Mogul") until a homogeneous solution is obtained. The ethyl alcohol serves as a viscosity-reducer and may be omitted by using a larger proportion of the solvent.

The adhesive solution is coated upon the back surface of the beaded sheeting, as by use of a doctor blade, and the coated sheeting is then festooned upon racks and put through a drying oven to drive off the solvent. Six hours at 165° F. is a suitable combination for the drying step.

When the coated web is removed from the drying oven it is wound into rolls and at the same time a liner of regenerated cellulose film ("Cellophane") is wound in so as to contact the adhesive surface and be detachably adhered thereto, thereby covering the adhesive surface to prevent sticking of the adjacent beaded surface and to facilitate use of the sheeting.

Alternatively, the adhesive coating can be applied by a transfer method as has been described in connection with pressure-sensitive adhesive coatings. In this case the adhesive coated Cellophane liner is laminated to the back surface of the beaded reflector sheeting before the adhesive coating thereon has been fully dried (i. e. while still slightly tacky and warm), the trace of residual solvent being left in.

The Cellophane liner can be removed, after the sheet is cut to shape in making up signs, or whenever desired, by moistening with water and peeling off.

The adhesive coating may be activated to a tacky surface condition by moistening with V. M. P. naphtha, heptane or gasoline, etc. The sheet is then applied to the sign base and is held by the tacky adhesive during setting of the adhesive as the result of solvent evaporation. Or the reflector sheet may be applied directly to the base and activated by heating with an iron or by placing in an oven (at say 225° F. for five minutes), followed by rolling to produce firm contacting.

Having described various embodiments of my invention, for purposes of illustration rather than limitation, what I claim is as follows:

1. A flexible "backless" reflex reflector sheet comprising a self-sustaining flexible film sheet, a light-returning layer of small transparent spheres bonded in one side of the film sheet so as to provide a multiplicity of contiguous convex lens elements, and pigment light-reflective means underlying the spheres so as to produce in combination therewith a reflex-reflection of incident beams of light, there being no permanent or integral backing underlying the reflective means; constituting a thin and pliable, unitary, reflex reflector sheet adapted to be readily cut and to be readily attached to base surfaces.

2. A "backless" reflex reflector sheet according to claim 1, having upwards of 10,000 spheres per square inch and a caliper thickness of not over about 20 mils.

3. A "backless" reflex reflector sheet according to claim 1, further characterized by being stretchy and adapted to be conformed to the surfaces of embossed sign bases.

4. A "backless" reflex reflector sheet according to claim 1, having upwards of 10,000 spheres per square inch, and being stretchy to the extent of at least about 20% as herein described.

5. A "backless" reflex reflector sheet according to claim 1, having a flexible liner removably attached to its back side and from which it can be readily stripped.

6. A "backless" reflex reflector sheet according to claim 1, having a flexible liner removably attached to its back side and from which it can be readily stripped without moistening.

7. A "backless" reflex reflector sheet according to claim 1, having a thin back size coating on its back side and a flexible liner removably attached to the outer surface thereof, the liner adhering poorly to the back size coating so that the liner can be readily stripped off when desired.

8. A "backless" reflex reflector sheet according to claim 1, having an adhesive back side so as to be ready-to-lay.

9. A flexible "backless" reflex reflector sheet, comprising a self-sustaining transparent flexible film sheet having a light-returning layer of small transparent spheres embedded in one side and a flexible pigmented reflector film bonded to the other side, there being no permanent or integral backing underlying the reflector; constituting a thin and pliable, unitary, reflex reflector sheet adapted to be readily cut and to be readily attached to base surfaces.

10. A "backless" reflex reflector sheet according to claim 9, wherein the reflector is a coating containing metallic reflecting flakes lying substantially parallel to the surface thereof underlying the layer of spheres.

11. A "backless" reflex reflector sheet according to claim 9, wherein the reflector is a coating containing a non-specular reflective pigment.

12. A "backless" reflex reflector sheet according to claim 9, wherein the reflector film includes contrasting portions so as to provide the desired insignia visible through the overlying layer of spheres.

13. A "backless" reflex reflector sheet according to claim 9, having a flexible liner removably attached to its back side and from which it can be readily stripped.

14. A "backless" reflex reflector sheet according to claim 9, having a flexible liner removably attached to its back side and from which it can be readily stripped without moistening.

15. A "backless" reflex reflector sheet according to claim 9, having a waterproof adhesive coating on its back face so as to be ready-to-lay.

16. A flexible and weatherproof "backless" reflex reflector sheet adapted for use in outdoor signs and markers, comprising a flexible transparent support and binder sheet having a continuous light-returning layer of small transparent spheres embedded in the front face and spaced from the back face so as to substantially increase reflex-reflection brilliancy as compared with no spacing, and a flexible pigmented reflector film bonded to said back face of the transparent sheet, constituting a self-sustaining flexible reflex reflector sheet, there being no permanent or integral backing underlying the reflector.

17. A "backless" reflex reflector sheet according to claim 16, having upwards of 10,000 spheres per square inch, and being stretchy to the extent of at least about 20% as herein described.

18. A flexible and weatherproof high-brilliancy "backless" reflex reflector sheet material adapted to be wound in rolls and to be readily cut and applied to base surfaces for making outdoor signs and markers, comprising a flexible transparent support and binder sheet having a continuous light-returning layer of small transparent spheres embedded in the front face and spaced from the back face so as to substantially increase reflex-reflection brilliancy as compared with no spacing, and a metallic reflector coating bonded to said back face of the transparent sheet, formed of metallic reflecting flakes lying substantially parallel to the plane of the sheet and held by a binder, there being no permanent or integral backing underlying said reflector coating.

19. A flexible "backless" reflex reflector sheet comprising a flexible pigmented reflector film, a transparent and flexible spacing film bonded thereover, a transparent and flexible binder coating bonded to the spacing film, and a light-returning layer of small transparent spheres partially embedded in the binder coating and substantially touching the spacing film, the spacing distance being such as to substantially increase reflex-reflection brilliancy as compared with no spacing, constituting a self-sustaining reflex reflector sheet, there being no permanent or integral backing underlying the reflector film.

20. A "backless" reflex reflector sheet according to claim 19, having upwards of 10,000 spheres per square inch and a caliper thickness of not over about 20 mils.

21. A "backless" reflex reflector sheet according to claim 19, wherein the spheres have an average diameter not exceeding about 10 mils and substantially greater than the thickness of the spacing film, and the sheet has a dead-stretch permitting ready conformation to irregular base surfaces, the degree of stretch being at least about 20% as herein described.

22. In a sign having a base, an overlying preformed flexible "backless" reflex reflector sheet bonded thereto, comprising a self-sustaining flexible film sheet, a light-returning layer of small transparent spheres bonded in the outer side of the film sheet and pigment light-reflective means underlying the spheres so as to produce in combination therewith a reflex-reflection of incident beams of light.

23. In a sign adapted for outdoor exposure and having a relatively rigid base with raised insignia, an overlying preformed flexible and stretchable "backless" weatherproof reflex reflector sheet conforming to the surface of the sign base and adhesively bonded thereto, comprising a self-sustaining flexible and stretchable film sheet, a light-returning layer of small transparent spheres bonded in the outer side of the film sheet and pigment light-reflective means underlying the spheres so as to produce in combination therewith a reflex-reflection of incident beams of light.

24. In a sign adapted for outdoor exposure and having a relatively rigid base with raised insignia, an overlying preformed flexible and stretchable "backless" weatherproof reflex reflector sheet conforming to the surface of the sign base and adhesively bonded thereto, comprising a self-sustaining flexible and stretchable transparent support and binder sheet having a continuous light-returning layer of small transparent spheres embedded in the outer face and spaced from the inner face so as to substantially increase reflex-reflection brilliancy as compared with no spacing, and a stretchable pigmented reflector film or coating bonded to said inner face of the transparent sheet, the average diameter of the spheres not exceeding about 10 mils and the preformed reflex reflector sheet being stretchy to the extent of at least about 20% as herein described and sufficient to permit conformation to the sign base.

PHILIP V. PALMQUIST.